(12) United States Patent
Liang et al.

(10) Patent No.: US 10,634,495 B2
(45) Date of Patent: Apr. 28, 2020

(54) METHOD FOR SELECTING WAVE HEIGHT THRESHOLD

(71) Applicant: OCEAN UNIVERSITY OF CHINA, Qingdao (CN)

(72) Inventors: Bingchen Liang, Qingdao (CN); Zhuxiao Shao, Qingdao (CN); Huajun Li, Qingdao (CN); Huijun Gao, Qingdao (CN); Hongda Shi, Qingdao (CN); Fengguang Xue, Qingdao (CN); Dejuan Zhang, Qingdao (CN); Xinxin Liang, Qingdao (CN)

(73) Assignee: OCEAN UNIVERSITY OF CHINA, Shandong (CN)

( * ) Notice: Subject to any disclaimer, the term of this patent is extended or adjusted under 35 U.S.C. 154(b) by 0 days.

(21) Appl. No.: 16/547,514

(22) Filed: Aug. 21, 2019

(65) Prior Publication Data
US 2019/0376788 A1    Dec. 12, 2019

Related U.S. Application Data

(63) Continuation of application No. PCT/CN2018/077871, filed on Mar. 2, 2018.

(30) Foreign Application Priority Data

Nov. 29, 2017    (CN) .............................. 2017 1 122685

(51) Int. Cl.
*G01C 13/00*    (2006.01)
*G06F 17/18*    (2006.01)
(Continued)

(52) U.S. Cl.
CPC ........... *G01C 13/004* (2013.01); *G06F 17/18* (2013.01); *G06F 30/00* (2020.01); *G06F 2111/04* (2020.01); *G06F 2111/08* (2020.01)

(58) Field of Classification Search
CPC ......... G01C 3/004; G06F 17/18; G06F 17/50; G06F 2217/06; G06F 2217/10
See application file for complete search history.

(56) References Cited

U.S. PATENT DOCUMENTS

2019/0324444 A1 * 10/2019 Cella ...................... G05B 19/12

FOREIGN PATENT DOCUMENTS

CN    104699961 A    6/2015

OTHER PUBLICATIONS

Lerma, Alexandre Nicolae et al., "Spatial variability of extreme wave height along the Atlantic and channel French coast" Journal of Ocean Engineering, vol. 97, (2015), pp. 175-185.
(Continued)

*Primary Examiner* — Stephanie E Bloss
(74) *Attorney, Agent, or Firm* — J.C. Patents (57) ABSTRACT

The present application relates to a method for selecting a wave height threshold, based on a target location, original wave height samples are acquired, and a wave height threshold interval are obtained; combined with wave height threshold and based on GPD and specified return period, a design wave height $Hs_{i,j}$ corresponding to each threshold within the wave height threshold interval is calculated according to the sample wave height values which are greater that the threshold; a difference is calculated to obtain a stable threshold interval, and a threshold within the stable threshold interval is selected as a reasonable threshold for design wave height estimation. In this method, the stability of estimated values can be determined directly and objectively to realize wave height threshold selection.

20 Claims, 6 Drawing Sheets

(51) Int. Cl.
*G06F 30/00* (2020.01)
*G06F 111/04* (2020.01)
*G06F 111/08* (2020.01)

(56) References Cited

OTHER PUBLICATIONS

Li, Hongjie et al., "The Main Influencing Factors of Ocean Extreme Wave Height Calculation" Proceedings of the 17th China Ocean (Ashore) Engineering Symposium, (Nov. 2015), pp. 190-199, English Abstract is provided.

Li, Jiangxia et al., "Estimation of mean and extreme waves in the East China Seas" Applied Ocean Research, vol. 56, (2016), pp. 35-47.

Liu, De-Fu et al., "Multivariate Compound Extreme Value Distribution and Its Application" Periodical of Ocean University of China, vol. 34, No. 5, (Sep. 2004), pp. 893-902, English Abstract is at p. 902.

Liu, De-Fu et al., "Risk assessment of design wave criteria for two coastal defense standards of China" Journal of the Ocean Engineering, vol. 31, No. 3, (May 2013), pp. 70-76, English Abstract is provided.

Luo, Yao, "Study on Theories and Methods Return Value Calculation of Extreme Environmental Conditions with POT Method for Ocean Engineeing" PHD Dissertation paper of South China University of Technology, Guangzhou, China, (Apr. 2013).

Shao, Zhuxiao et al., "Analysis of Extreme Waves with Tropical Cyclone Wave Hindcast Data" Proceeding of the Twenty-seventh (2017) International Ocean and Polar Engineering Conference, International Society of Offshore and Polar Engineers, (Jun. 25-30, 2017) pp. 30-33.

The International Search Report of corresponding international application No. PCT/CN2018/077871, dated Aug. 29 2018.

The Chinese First Examination Report and Search Report of corresponding Chinese application No. 201711226852.2, dated Jun. 20, 2018.

\* cited by examiner

METHOD FOR SELECTING WAVE HEIGHT
THRESHOLD

CROSS-REFERENCE TO RELATED
APPLICATION

This application is a continuation of International Application No. PCT/CN2018/077871 filed on Mar. 2, 2018, which in turn claims the priority benefits of Chinese application No. 201711226852.2 filed on Nov. 29, 2017. The contents of these prior applications are hereby incorporated by reference in their entirety.

TECHNICAL FIELD

The present application relates to a method for selecting a wave height threshold, and in particular to a method for selecting a threshold for design wave height estimation.

BACKGROUND OF THE PRESENT INVENTION

Proper design wave height estimation is very important for the design of ocean and coastal engineering, for example, the structural design of wharfs and breakwaters and the construction of ocean platforms. In recent years, performing the design wave height estimation by a Peak Over Threshold (POT) method and in combination with a Generalized Pareto Distribution (GPD) method has been widely applied in the ocean and coastal engineering. The POT method is a sampling method in which independent large values exceeding a certain fixed value (threshold) are selected as samples. The GPD method is a probability distribution model which can perform design wave height estimation, in different return periods, on the peak over threshold extracted by the POT method.

The key to perform design wave eight estimation by the POT/GPD method is the selection of thresholds. The conventional threshold selection method is a GPD parameter graphical method, that is, a lower boundary value within a stable GPD parameter interval is selected as a threshold. The conventional method has the following disadvantages: the influence from human factors is strong, a higher degree of professional knowledge is required for subjective judgment, the fluctuation in GPD parameters is large, and the stable threshold value is not obvious and not unique, and the conventional method cannot be applied regionally. As an indirect threshold selection method, a threshold is determined by the GPD parameter graphical method and the design wave height estimation is then performed. In this indirect threshold selection method, the sample stability is obtained by determining the stability of GPD parameter, and a reasonable threshold corresponding to the stable design wave height is then obtained.

SUMMARY OF THE PRESENT INVENTION

In view of the deficiencies of the prior art, the present application provides a method for selecting a wave height threshold, which can objectively and spontaneously select a threshold to realize design wave height estimation. The present invention employs the following technical solutions.

A method for selecting a wave height threshold is provided, including the following steps of:

S1: acquiring, based on a target location, original wave height samples, determining the number of the samples $N_{tot}$ and calculating, within a candidate threshold interval (i.e., a first threshold interval) determined by a maximum wave height $u_M$ and a minimum wave height $u_1$, and at a step size (i.e., a threshold step size), a normalized candidate threshold to obtain a wave height threshold interval (i.e., a second threshold interval);

wherein each threshold within the wave height threshold interval is a candidate threshold;

S2: determining a return period sequence i for a design wave height, wherein one specified return period can be determined by the step S2;

S3: calculating, based on a generalized Pareto distribution and based on the specified return period i and according to the sample wave height value(s) exceeding the candidate threshold $u_j$, a design wave height corresponding to each candidate threshold $u_j$ within the wave height threshold interval, to obtain a design wave height value $Hs_{i,j}$;

specifically, in the step S3, for each candidate threshold, by using all original sample data in the original wave height sample greater than the candidate threshold, based on the specified return period and according to a generalized Pareto distribution formula, calculating a design wave height corresponding to each candidate threshold $u_j$ within the wave height threshold interval to obtain a design wave height value $Hs_{i,j}$, wherein $u_j$ can be any candidate threshold within the wave height threshold interval and j is an integer greater than 0;

S4: calculating a difference $\Delta Hs_{i,j} = Hs_{i,j} - Hs_{i,j-1}$, between design wave height values corresponding to adjacent candidate thresholds, which is called a wave height difference for short; and S5: if $\Delta Hs_{i,j} \leq 0$ and three successive wave height differences following $\Delta Hs_{i,j}$ includes negative but not all negative or are all 0, considering a candidate threshold $u_j$ corresponding to $\Delta Hs_{i,j}$ as a lower boundary of a stable threshold interval; and, if six successive wave height differences following $\Delta Hs_{i,j+m}$ are all greater than or equal to 0 (where m is an integer greater than 0), considering a candidate threshold $u_{j+m}$ corresponding to $\Delta Hs_{i,j+m}$ as a higher boundary of the stable threshold interval, wherein a threshold interval $[u_j, u_{j+m}]$ is the stable threshold interval, and a candidate threshold within the stable threshold interval is selected as a reasonable threshold for design wave height estimation.

In the step S1, the step size (i.e., the threshold step size) can be manually specified according to the size of the actual original wave height samples, or can also be calculated or selected based on experience. In the present application, the threshold step size $\Delta u$ is preferably determined by the following step size calculation rule:

$$\Delta u = \frac{u_M - u_1}{N_{tot}}, \quad (1)$$

wherein two decimal places of the calculated result are rounded up.

The specified return period is generally selected according to the user's requirements. For example, when it is expected that the service life of the coastal engineering to be built is 100 years, the specified return period is 100 year; and, when it is expected that the service life of the coastal engineering to be built is 200 years, the specified return period is 200 year. It is also possible that one specified return period is divided and/or extended at a time step to obtain a plurality of sub-specified return periods, thereby assisting in determining the design wave height value of the parent specified return period and additionally obtaining design wave height values of the plurality of sub-specified return periods. For example, when the specified return period is set as 100 years, (1) the specified return period can be divided into three sub-specified return periods at a time step of 30-year, which are 40 year, 70 year and 100 year, respectively; (2) the specified return period can be extended into three sub-specified return periods at a time step of 100-year, which are 100 year, 200 year and 300 year, respectively; and, (3) the specified return period can also be divided and extended into four sub-specified return periods at a time step of 50-year, which are 50 year, 100 year, 150 year and 200 year, respectively.

Therefore, as a preferred implementation, when the specified return period is divided and/or extended into a plurality of sub-specified return periods, a design wave height value $Hs_{i,j}$ corresponding to each candidate threshold $u_j$ in each sub-specified return period is calculated respectively according to S3; and further, a stable threshold interval in each sub-specified return period is obtained respectively by the steps S4 and S5.

As a preferred implementation, a higher boundary value $u_{j+m}$ corresponding to the stable threshold interval $[u_j, u_{j+m}]$ is selected as a reasonable threshold.

As a preferred implementation, in the step S5, it is further determined whether the number of times when six successive wave height differences following $\Delta Hs_{i,j+m}$ are equal to 0 is less than 3; and, if so, $u_{j+m}$ corresponding to $\Delta Hs_{i,j+m}$ is considered as a higher boundary of the stable threshold interval.

As a preferred implementation, in the step S5, during the determination of a lower boundary of the stable threshold interval, it is further determined whether three successive wave height differences following $\Delta Hs_{i,j}$ are greater than or equal to the threshold step size; if so, $u_j$ is given up as the lower boundary of the stable threshold interval; and if not, $u_j$ is determined as the lower boundary of the stable threshold interval. Further, it is determined whether the wave height difference corresponding to $\Delta Hs_{i,j}$ itself is greater than or equal to the threshold step size; if so, $u_j$ is given up; and if not, $u_j$ is determined as the lower boundary of the stable threshold interval.

As a preferred implementation, in the step S5, during the determination of the lower boundary of the stable threshold interval, it is further determined whether there is an original wave height sample value between $u_j$ and $u_{j-1}$; if so, $u_j$ is determined as the lower boundary of the stable threshold interval; and if not, $u_j$ is given up as the lower boundary of the stable threshold interval.

As a preferred implementation, during the determination of the stable threshold interval $[u_j, u_{j+m}]$, the length m+1 of the stable threshold interval needs to be greater than 3, that is, m is an integer greater than 2.

As a preferred implementation, when after the specified return period is divided and/or extended at a time step to obtain a plurality of sub-specified return periods, the method for selecting a wave height threshold further includes the following step of:

S6: further defining characteristic parameter $ch_{i,j}$, where a characteristic parameter corresponding to each candidate threshold in a stable threshold interval is defined as 1, a characteristic parameter corresponding to each candidate threshold in a non-stable threshold interval is defined as 0, and values of the characteristic parameter $ch_{i,j}$ corresponding to the candidate thresholds $u_j$ within the stable threshold interval in each return period are accumulated to obtain sum(j); and, acquiring a maximum sequence of sum(j) overlapped in each return period, and using a stable threshold interval containing a threshold $u_j$ corresponding to the maximum j value in the maximum sequence of sum(j) as a final stable threshold interval.

The present application has the following beneficial effects.

The present application provides a method for selecting a wave height threshold, and relates to a method for selecting a threshold for design wave height estimation in different return periods, particularly a method for selecting a threshold for design wave height estimation by a POT method and in combination with a GPD method. In this method, by analyzing the characteristics of design wave heights corresponding to thresholds in a threshold interval, a stable threshold interval is determined, and a reasonable threshold is further obtained. Based on this reasonable threshold, design wave height estimation can be performed to obtain design wave heights in different return periods.

Compared with the prior art, in the present application, the stability of estimated values can be directly determined by an objective determination method to realize threshold selection without influences from human factors, and the selection result of the wave height threshold can be obtained directly and objectively. The present application can realize autonomous judgment and regional application, and can better provide services for the ocean and coastal engineering.

DETAILED DESCRIPTION OF THE PRESENT INVENTION

The specific embodiments of the present application will be described clearly and fully in combination with the accompanying drawings. It is apparent that the embodiments described in the specific embodiments are only part of the embodiments of the present application, and not all of them. All other embodiments obtained by a person skilled in the art based on the embodiments of the present application without creative efforts are within the scope of the present application.

The present application provides a method for selecting wave height threshold, which is a direct method for selecting design wave height threshold and can be applied to the auxiliary guidance of offshore design.

Figure 1:
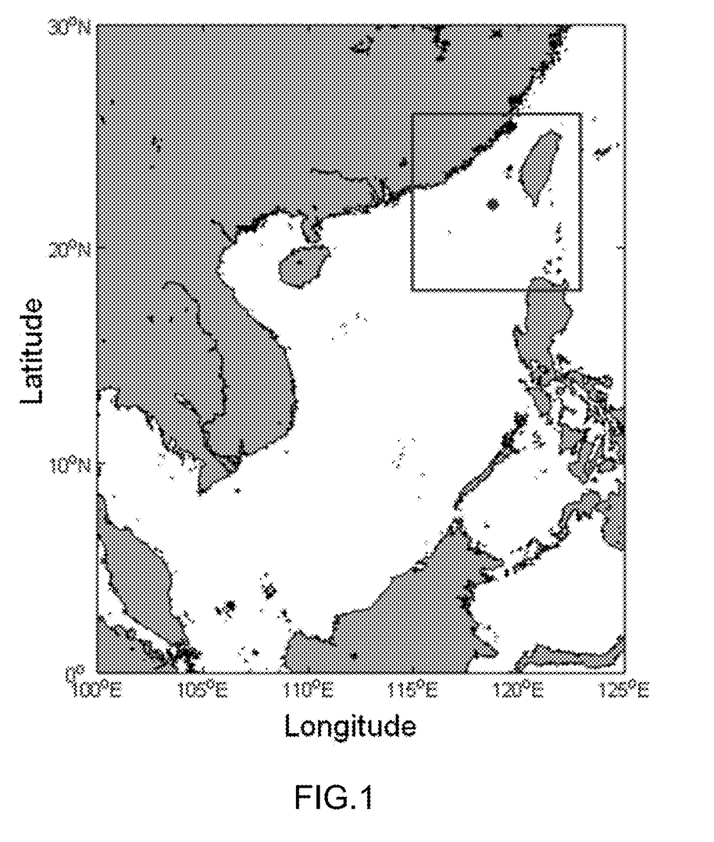
FIG. 1 is a schematic diagram of a typhoon influence range at a point location with geographical coordinate (22.00° N, 118.75° E)

Typhoon is prevalent in the South China Sea. In this embodiment, the South China Sea is taken as a research object, and the geographical coordinate point (22.00° N, 118.75° E) of the South China Sea is selected as a research object, and the wave height data of the coordinate location is obtained. The water depth at this point is 1345.3 m, and 40-year is selected as a time period, the occurrence number of typhoon at this location is 328 in 40 years, and the distribution location of typhoon refers to an area marked by a square in FIG. 1.

(1) Determination of the Threshold Interval

Based on a target location coordinate, original wave height samples within a certain time period is acquired, and the number of the samples $N_{tot}$, the maximum wave height $u_M$ in the samples and the minimum wave height $u_1$ in the simples are determined. Wherein, the target location coordinate is a geographical coordinate, which shows a location in the South China Sea (22.00° N, 118.75° E) in the present embodiment. Considering that the wave height is relative high in extreme weather, the influence on the wave height from the extreme weather is taken into consideration during the selection of the original wave height samples, and the wave height when a typhoon passes is selected as a research sample. Specifically, a peak in each typhoon process is selected as the original wave height sample. On this basis, a set of original wave height samples within a 40-year period is obtained, with the number of samples $N_{tot}$ to being 328, the maximum wave height $u_M$ being 14.05 m and the minimum wave height $u_1$ being 0.24 m; and, the obtained candidate threshold interval is [0.24 m, 14.05 m], which is also referred to as a first threshold interval.

Generally, the certain time period is determined according to the existing records. For example, if there are 20 years of records on the target location, 20-year is selected as the time period. In the present application, there are 40 years of records about the South China Sea, so 40-year is selected as the time period. Generally, if the time period is longer, the obtained original wave height sample is larger, and the calculation result is more realistic.

Since there are no definite rules under natural conditions, the obtained wave height data is dispersed in the candidate threshold interval. In order to facilitate the subsequent calculation, the first threshold interval is further normalized. The processing method is as follows: after the first threshold interval is obtained, a normalized candidate threshold is obtained by calculating in a certain step size within the first threshold interval. The step size can be manually specified or can be calculated based on the experience (according to the characteristics of the original wave height sample). In this embodiment, the used step size calculation rule is:

$$\Delta u = \frac{u_M - u_1}{N_{tot}}. \quad (1)$$

Two decimal places of the calculated result is rounded up. In this embodiment, the calculated result 0.0421 of Formula (1) is rounded up to reserve to two decimal places, and 0.05 m is selected as the threshold step size $\Delta u$. In accordance with the step size calculation rule, candidate thresholds of 0.25, 0.30, 0.35, 0.40 . . . 14.05, also referred to as normalized candidate thresholds, are obtained, and there are 276 candidate thresholds. Thus, a wave height threshold interval [0.25 m, 14.05 m] having a step size of 0.05 m is also obtained, which is also referred to as a second threshold interval.

It is to be noted that: the range of the first threshold interval is close to that of the second threshold interval; however, the first threshold interval contains original wave height samples which are actually recorded wave height data, while the second threshold interval contains normalized wave height data (candidate thresholds) having a certain step size and these candidate thresholds may be the same as or different from the wave height data in the original wave height samples.

(2) Determination of the Return Period Sequence of the Design Wave Height

A return period sequence of the design wave height is determined. As known to those skilled in the art, the return period sequence of the design wave height reflects the design requirements of the design wave height, that is, the requirement of how long the return period is needs to be satisfied during the selection of the design wave height. For example, it is possible to select a 50-year as the specified return period, or it is also possible to select a 100-year or 150-year as the specified return period. In different return periods, the design wave height values will be different. For example, if a 50-year is selected as a return period, i=50; and, if a 100-year is selected as a return period, i=100. It is also possible to divide and/or extend the specified return period. In this embodiment, i=50:50:200 is selected as the return period. That is, considering the design wave height in 200 years (where the specified return period is 200 years), by using 50 years as a starting point and selecting 50-year as a time step of the return period, sub-specified return periods of 50-year, 100-year, 150-year and 200-year can be obtained as results, respectively. In this embodiment, it is also possible that the specified return period is 50-year, and the specified return period is extended at a time step of 50-year, so that the same four sub-specified return periods described above are obtained.

(3) Calculation of the Design Wave Height Value

After the candidate thresholds are determined, for each candidate threshold, by using all original sample data, which is in the set of original wave height samples, greater than the candidate threshold, based on a generalized Pareto distribution (Formula 2) and based on the specified return period, and according to Formula 2, a design wave height value $Hs_{i,j}$ corresponding to each candidate threshold $u_j$ in the second threshold interval is calculated. Here, it is to be noted that the second threshold interval is used to normalize the sample processing and facilitate the processing of data calculating ($u_j$ can be any candidate threshold in the second threshold interval, and it is obvious for this embodiment that $1 \leq j \leq 276$ and j is an integer).

$$Hs_{i,j} = \begin{cases} u_j + [(\lambda i)^k - 1]\sigma/k & k \neq 0 \\ u_j + \sigma \ln(\lambda i) & k = 0 \end{cases}, \quad (2)$$

where $u_j$ is any candidate threshold, i denotes a specified return period, λ, σ and k are the annual mean number of samples, the scale parameter and the shape parameter corresponding to the threshold $u_j$, respectively, and $Hs_{i,j}$ is the calculated design wave height value.

The calculation of the design wave height value $Hs_{i,j}$ belongs to the well-known conventional technology, and the specific calculation process will not be explained too much in the present application and might refer to Zhuxiao Shao, Bingchen Liang, Xinying Pan and Huijun, Gao. "Analysis of Extreme Waves with Tropical Cyclone Wave Hindcast Data," Proceedings of the Twenty-seventh (2017) International Ocean and Polar Engineering Conference, June 25-30, 2017 (P. 30-33).

Specifically, in this embodiment, 276 candidate thresholds have been obtained based on the first threshold interval and the step size calculation rule; and, one corresponding design wave height value $Hs_{i,j}$ can be calculated for each candidate threshold $u_j$, thus, 276 design wave height values can be obtained for one specified return period. For example, for the first candidate threshold of 0.25 m, the specified return period is 50-year, and a design wave height value $Hs_{50.1}$ corresponding to the candidate threshold 0.25 m is calculated by using all original sample data greater than 0.25 m in the set of original wave height samples (through statistical analysis, it is hypothesized that only 0.24 m does not satisfy the condition, then there are 327 values, less than $N_{tot}$ 328) and according to Formula 2. Similarly, a design wave height value $Hs_{aw}$ corresponding to the candidate threshold 0.25 m in the 100-year specified return period can be obtained, a design wave height value $Hs_{150.1}$ corresponding to the candidate threshold 0.25 m in the 150-year specified return period can be obtained, and a design wave height value $Hs_{200.1}$ corresponding to the candidate threshold 0.25 m in the 200-year specified return period can be obtained. For another example, for the fifth candidate threshold 0.45 m, the specified return period is 50-year, and a design wave height value corresponding to the candidate threshold 0.45 m is calculated by using all original sample data greater than 0.45 m in the set of original wave height samples (through statistical analysis, it is assumed that there are 310 values, less than $N_{tot}$ 328) and according to Formula 2. Similarly, a design wave height value $Hs_{100.5}$ corresponding to the candidate threshold 0.45 m in the 100-year specified return period can be obtained, a design wave height value $Hs_{150.5}$ corresponding to the candidate threshold 0.45 m in the 150-year specified return period can be obtained, and a design wave height value $Hs_{200.5}$ corresponding to the candidate threshold 0.45 m in the 200-year specified return period can be obtained. The other design wave height values corresponding to other candidate thresholds can be calculated in the same way, and the calculation process will not be repeated here. Therefore, for the 50-year specified return period, 276 design value height values can be obtained; and, also for the 100-year, 150-year and 200-year specified return period, 276 design value height values can be obtained, respectively.

With reference to FIGS. 2-5 (since the second threshold interval is too large, only a part of the interval is shown in FIGS. 2-5), the changes of design wave height values based on the candidate thresholds when the return period is 50-year, 100-year, 150-year and 200-year respectively are shown. In Table 1, part candidate thresholds are selected to describe the design wave heights corresponding to the candidate thresholds in different return periods. For example, the design wave height value corresponding to the candidate threshold 3 is obtained by the above-described calculation method using all wave height sample data greater than 3 in the original wave height samples.

TABLE 1

Design wave height values corresponding to candidate thresholds in different return periods

| | 50-year return period | | | 100-year return period | | | 150-year return period | | | 200-year return period | | |
|---|---|---|---|---|---|---|---|---|---|---|---|---|
| Candidate threshold | Design wave height value | Difference | Characteristic parameter | Design wave height value | Difference | Characteristic parameter | Design wave height value | Difference | Characteristic parameter | Design wave height value | Difference | Characteristic parameter |
| 3 | 11.93 | | 0 | 12.58 | | 0 | 12.89 | | 0 | 13.09 | | 0 |
| 3.05 | 11.92 | −0.01 | 0 | 12.57 | −0.01 | 0 | 12.89 | 0 | 1 | 13.09 | 0 | 1 |
| 3.1 | 11.97 | 0.05 | 0 | 12.61 | 0.04 | 0 | 12.92 | 0.03 | 1 | 13.11 | 0.02 | 1 |
| 3.15 | 12.02 | 0.05 | 0 | 12.65 | 0.04 | 0 | 12.95 | 0.03 | 1 | 13.14 | 0.03 | 1 |
| 3.2 | 11.99 | −0.03 | 0 | 12.63 | −0.02 | 0 | 12.93 | −0.02 | 1 | 13.13 | −0.01 | 1 |
| 3.25 | 12.01 | 0.02 | 0 | 12.64 | 0.01 | 0 | 12.94 | 0.01 | 1 | 13.14 | 0.01 | 1 |
| 3.3 | 12.06 | 0.05 | 0 | 12.68 | 0.04 | 0 | 12.98 | 0.04 | 1 | 13.17 | 0.03 | 1 |
| 3.35 | 12.07 | 0.01 | 0 | 12.69 | 0.01 | 0 | 12.99 | 0.01 | 1 | 13.17 | 0 | 1 |
| 3.4 | 12.09 | 0.02 | 0 | 12.7 | 0.01 | 0 | 13 | 0.01 | 1 | 13.18 | 0.01 | 1 |
| 3.45 | 12.08 | −0.01 | 1 | 12.7 | 0 | 1 | 12.99 | −0.01 | 1 | 13.18 | 0 | 1 |
| 3.5 | 12.08 | 0 | 1 | 12.7 | 0 | 1 | 12.99 | 0 | 1 | 13.18 | 0 | 1 |
| 3.55 | 12.05 | −0.03 | 1 | 12.68 | −0.02 | 1 | 12.98 | −0.01 | 1 | 13.17 | −0.01 | 1 |
| 3.6 | 12.05 | 0 | 1 | 12.67 | −0.01 | 1 | 12.97 | −0.01 | 1 | 13.17 | 0 | 1 |
| 3.65 | 12.04 | −0.01 | 1 | 12.67 | 0 | 1 | 12.97 | 0 | 1 | 13.17 | 0 | 1 |
| 3.7 | 12.08 | 0.04 | 1 | 12.7 | 0.03 | 1 | 12.99 | 0.02 | 1 | 13.19 | 0.02 | 1 |
| 3.75 | 12.09 | 0.01 | 1 | 12.71 | 0.01 | 1 | 13 | 0.01 | 1 | 13.19 | 0 | 1 |
| 3.8 | 12.07 | −0.02 | 1 | 12.69 | −0.02 | 1 | 12.99 | −0.01 | 1 | 13.18 | −0.01 | 1 |
| 3.85 | 12.04 | −0.03 | 1 | 12.67 | −0.02 | 1 | 12.98 | −0.01 | 1 | 13.17 | −0.01 | 1 |
| 3.9 | 12.03 | −0.01 | 1 | 12.67 | 0 | 1 | 12.97 | −0.01 | 1 | 13.17 | 0 | 1 |
| 3.95 | 12.03 | 0 | 1 | 12.67 | 0 | 1 | 12.97 | 0 | 1 | 13.17 | 0 | 1 |
| 4 | 12.06 | 0.03 | 1 | 12.69 | 0.02 | 1 | 12.99 | 0.02 | 1 | 13.19 | 0.02 | 1 |
| 4.05 | 12.04 | −0.02 | 1 | 12.67 | −0.02 | 1 | 12.98 | −0.01 | 1 | 13.18 | −0.01 | 1 |
| 4.1 | 12.05 | 0.01 | 1 | 12.69 | 0.02 | 1 | 12.99 | 0.01 | 1 | 13.19 | 0.01 | 1 |
| 4.15 | 12.07 | 0.02 | 1 | 12.7 | 0.01 | 1 | 13 | 0.01 | 1 | 13.2 | 0.01 | 1 |
| 4.2 | 12.04 | −0.03 | 1 | 12.68 | −0.02 | 1 | 12.99 | −0.01 | 1 | 13.19 | −0.01 | 1 |
| 4.25 | 12.02 | −0.02 | 1 | 12.66 | −0.02 | 1 | 12.98 | −0.01 | 1 | 13.19 | 0 | 1 |
| 4.3 | 11.99 | −0.03 | 1 | 12.65 | −0.01 | 1 | 12.97 | −0.01 | 1 | 13.18 | −0.01 | 1 |
| 4.35 | 12.03 | 0.04 | 1 | 12.67 | 0.02 | 1 | 12.99 | 0.02 | 1 | 13.2 | 0.02 | 1 |
| 4.4 | 12.02 | −0.01 | 1 | 12.67 | 0 | 1 | 12.99 | 0 | 1 | 13.2 | 0 | 1 |
| 4.45 | 12.06 | 0.04 | 1 | 12.7 | 0.03 | 1 | 13.01 | 0.02 | 1 | 13.22 | 0.02 | 1 |
| 4.5 | 12.03 | −0.03 | 1 | 12.68 | −0.02 | 1 | 13 | −0.01 | 1 | 13.21 | −0.01 | 1 |

TABLE 1-continued

Design wave height values corresponding to candidate thresholds in different return periods

| | 50-year return period | | | 100-year return period | | | 150-year return period | | | 200-year return period | | |
|---|---|---|---|---|---|---|---|---|---|---|---|---|
| Candidate threshold | Design wave height value | Difference | Characteristic parameter | Design wave height value | Difference | Characteristic parameter | Design wave height value | Difference | Characteristic parameter | Design wave height value | Difference | Characteristic parameter |
| 4.55 | 12.03 | 0 | 1 | 12.68 | 0 | 1 | 13 | 0 | 0 | 13.22 | 0.01 | 1 |
| 4.6 | 12.02 | −0.01 | 1 | 12.68 | 0 | 1 | 13 | 0 | 0 | 13.22 | 0 | 1 |
| 4.65 | 12.02 | 0 | 1 | 12.68 | 0 | 1 | 13.01 | 0.01 | 0 | 13.22 | 0 | 0 |
| 4.7 | 12.03 | 0.01 | 1 | 12.69 | 0.01 | 1 | 13.02 | 0.01 | 0 | 13.24 | 0.02 | 0 |
| 4.75 | 12.03 | 0 | 1 | 12.69 | 0 | 1 | 13.02 | 0 | 0 | 13.24 | 0 | 0 |
| 4.8 | 12.05 | 0.02 | 1 | 12.71 | 0.02 | 1 | 13.03 | 0.01 | 0 | 13.25 | 0.01 | 0 |
| 4.85 | 12.04 | −0.01 | 1 | 12.71 | 0 | 1 | 13.04 | 0.01 | 0 | 13.26 | 0.01 | 0 |
| 4.9 | 12.04 | 0 | 1 | 12.71 | 0 | 1 | 13.04 | 0 | 0 | 13.26 | 0 | 0 |
| 4.95 | 12.01 | −0.03 | 1 | 12.7 | −0.01 | 1 | 13.04 | 0 | 0 | 13.27 | 0.01 | 0 |
| 5 | 12.01 | 0 | 1 | 12.7 | 0 | 1 | 13.04 | 0 | 0 | 13.28 | 0.01 | 0 |
| 5.05 | 11.99 | −0.02 | 1 | 12.69 | −0.01 | 1 | 13.05 | 0.01 | 0 | 13.29 | 0.01 | 0 |
| 5.1 | 11.99 | 0 | 1 | 12.69 | 0 | 1 | 13.06 | 0.01 | 0 | 13.3 | 0.01 | 0 |
| 5.15 | 12.02 | 0.03 | 1 | 12.72 | 0.03 | 1 | 13.08 | 0.02 | 0 | 13.32 | 0.02 | 0 |
| 5.2 | 12.02 | 0 | 1 | 12.73 | 0.01 | 1 | 13.09 | 0.01 | 0 | 13.33 | 0.01 | 0 |
| 5.25 | 12 | −0.02 | 1 | 12.72 | −0.01 | 0 | 13.1 | 0.01 | 0 | 13.35 | 0.02 | 0 |
| 5.3 | 12.02 | 0.02 | 1 | 12.74 | 0.02 | 0 | 13.11 | 0.01 | 0 | 13.37 | 0.02 | 0 |
| 5.35 | 12 | −0.02 | 1 | 12.74 | 0 | 0 | 13.13 | 0.02 | 0 | 13.39 | 0.02 | 0 |
| 5.4 | 12.04 | 0.04 | 1 | 12.77 | 0.03 | 0 | 13.15 | 0.02 | 0 | 13.41 | 0.02 | 0 |
| 5.45 | 12.07 | 0.03 | 1 | 12.79 | 0.02 | 0 | 13.17 | 0.02 | 0 | 13.42 | 0.01 | 0 |
| 5.5 | 12.09 | 0.02 | 1 | 12.81 | 0.02 | 0 | 13.19 | 0.02 | 0 | 13.44 | 0.02 | 0 |
| 5.55 | 12.12 | 0.03 | 1 | 12.83 | 0.02 | 0 | 13.2 | 0.01 | 0 | 13.46 | 0.02 | 0 |
| 5.6 | 12.1 | −0.02 | 1 | 12.84 | 0.01 | 0 | 13.22 | 0.02 | 0 | 13.49 | 0.03 | 0 |
| 5.65 | 12.09 | −0.01 | 0 | 12.85 | 0.01 | 0 | 13.25 | 0.03 | 0 | 13.53 | 0.04 | 0 |
| 5.7 | 12.09 | 0 | 0 | 12.87 | 0.02 | 0 | 13.28 | 0.03 | 0 | 13.56 | 0.03 | 0 |
| 5.75 | 12.09 | 0 | 0 | 12.89 | 0.02 | 0 | 13.33 | 0.05 | 0 | 13.63 | 0.07 | 0 |
| 5.8 | 12.11 | 0.02 | 0 | 12.92 | 0.03 | 0 | 13.36 | 0.03 | 0 | 13.66 | 0.03 | 0 |
| 5.85 | 12.14 | 0.03 | 0 | 12.95 | 0.03 | 0 | 13.39 | 0.03 | 0 | 13.7 | 0.04 | 0 |
| 5.9 | 12.16 | 0.02 | 0 | 12.98 | 0.03 | 0 | 13.42 | 0.03 | 0 | 13.73 | 0.03 | 0 |
| 5.95 | 12.19 | 0.03 | 0 | 13.01 | 0.03 | 0 | 13.45 | 0.03 | 0 | 13.76 | 0.03 | 0 |
| 6 | 12.21 | 0.02 | 0 | 13.05 | 0.04 | 0 | 13.51 | 0.06 | 0 | 13.83 | 0.07 | 0 |
| 6.05 | 12.24 | 0.03 | 0 | 13.08 | 0.03 | 0 | 13.55 | 0.04 | 0 | 13.87 | 0.04 | 0 |
| 6.1 | 12.26 | 0.02 | 0 | 13.13 | 0.05 | 0 | 13.61 | 0.06 | 0 | 13.95 | 0.08 | 0 |
| 6.15 | 12.31 | 0.05 | 0 | 13.14 | 0.01 | 0 | 13.6 | −0.01 | 0 | 13.91 | −0.04 | 0 |
| 6.2 | 12.34 | 0.03 | 0 | 13.17 | 0.03 | 0 | 13.63 | 0.03 | 0 | 13.95 | 0.04 | 0 |
| 6.25 | 12.36 | 0.02 | 0 | 13.22 | 0.05 | 0 | 13.69 | 0.06 | 0 | 14.02 | 0.07 | 0 |
| 6.3 | 12.4 | 0.04 | 0 | 13.24 | 0.02 | 0 | 13.69 | 0 | 0 | 14.01 | −0.01 | 1 |
| 6.35 | 12.44 | 0.04 | 0 | 13.27 | 0.03 | 0 | 13.73 | 0.04 | 0 | 14.05 | 0.04 | 1 |
| 6.4 | 12.48 | 0.04 | 0 | 13.29 | 0.02 | 0 | 13.72 | −0.01 | 0 | 14.03 | −0.02 | 1 |
| 6.45 | 12.53 | 0.05 | 0 | 13.31 | 0.02 | 0 | 13.72 | 0 | 0 | 14.02 | −0.01 | 1 |
| 6.5 | 12.58 | 0.05 | 0 | 13.32 | 0.01 | 0 | 13.72 | 0 | 0 | 14 | −0.02 | 1 |
| 6.55 | 12.58 | 0 | 0 | 13.36 | 0.04 | 0 | 13.78 | 0.06 | 0 | 14.08 | 0.08 | 0 |
| 6.6 | 12.63 | 0.05 | 0 | 13.38 | 0.02 | 0 | 13.78 | 0 | 0 | 14.06 | −0.02 | 0 |
| 6.65 | 12.65 | 0.02 | 0 | 13.41 | 0.03 | 0 | 13.82 | 0.04 | 0 | 14.1 | 0.04 | 0 |
| 6.7 | 12.68 | 0.03 | 0 | 13.43 | 0.02 | 0 | 13.83 | 0.01 | 0 | 14.11 | 0.01 | 0 |

(4) Calculation of Wave Height Difference

After the design wave height values are obtained, a difference $\Delta Hs_{i,j}=Hs_{i,j}-Hs_{i,j-1}$ between design wave height values corresponding to neighboring candidate thresholds is further calculated, which is called a wave height difference for short. The obtained calculated results correspond to the column "Difference" in Table 1.

(5) Determine of Stable Threshold Interval

Figure 6:
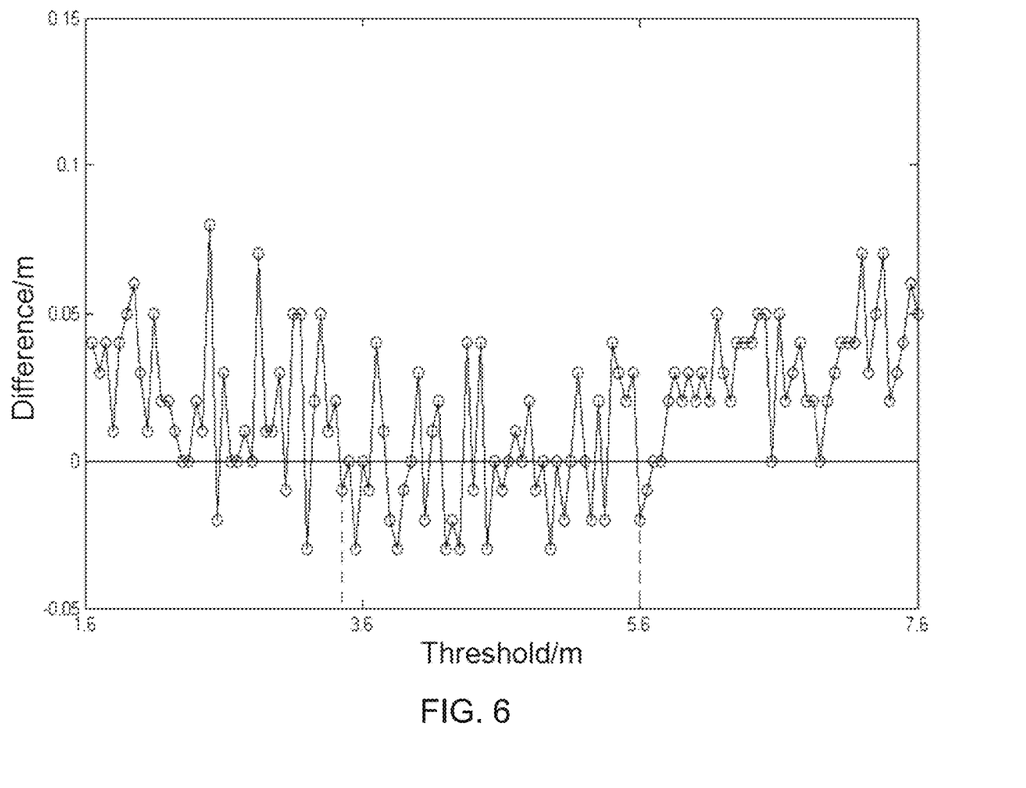
FIG. 6 shows the distribution of design wave height differences of a-50-year return period in the threshold interval.

The calculated results of $\Delta Hs_{i,j}$ are further determined to obtain a stable threshold interval. The determination criterion is described below. If $\Delta Hs_{i,j} \leq 0$ and three successive wave height differences following the $\Delta Hs_{i,j}$ are distributed around 0 (the three successive wave height differences are negative but not all negative or they are all 0), the candidate threshold $u_j$ corresponding to the $\Delta Hs_{i,j}$ is used as a lower boundary of the stable threshold interval. Specifically, here, there are three situations about the distribution around 0: (1) negative number and 0; (2) a combination of negative and positive numbers; and (3) all are 0. If six successive wave height differences following $\Delta Hs_{i,j+m}$ are greater than or equal to 0, the threshold $u_{j+m}$ corresponding to $\Delta Hs_{i,j+m}$ is used as a higher boundary of the stable threshold interval, and the threshold interval $[u_j, u_{j+m}]$ is a stable threshold interval (obviously, m>0 and m is an integer). As a preferred implementation, it is further determined whether the number of times when six sAH successive wave height differences following $\Delta Hs_{i,j+m}$ n are equal to 0 is less than 3; if so, $u_{j+m}$ corresponding to $\Delta Hs_{i,j+m}$ is used as a higher boundary of the stable threshold interval, the threshold interval $[u_j, u_{j+m}]$ is a stable threshold interval, and the thresholds in the stable threshold interval are selected as reasonable thresholds, so that the design wave height estimation can be further performed. FIG. 6 shows the distribution of design wave height differences in a 50-year return period.

As a preferred implementation, further, during the determination of the lower boundary value $u_j$ of the stable threshold interval $[u_j, u_{j+m}]$, the absolute values of the following three successive wave height differences need to be less than the threshold step size (in the case where the absolute value is greater than or equal to the threshold step size, it is indicated that the fluctuation of the distribution around 0 is large and it is not stable). In addition, the absolute value of the wave height difference corresponding to the lower boundary value $u_j$ itself is also preferably less than the threshold step size.

As a preferred implementation, during the determination of the stable threshold interval $[u_j, u_{j+m}]$, the length m+1 of the stable threshold interval needs to be greater than 3, that is, m is an integer greater than 2 (if m+1≤3, the stable threshold interval is short and the disturbance factor is large, so that it can be ignored).

Specifically, in this embodiment, as shown in Table 1, the candidate threshold 3.05 m corresponding to the design wave height value in the 50-year return period is not set as the lower boundary of the stable interval. It is because there is a situation that the absolute values of the following three wave height differences (0.05, 0.05, −0.03) is/are greater than or equal to 0.05, it will be ignored. Similarly, the candidate threshold 3.05 m corresponding to the design wave height value in the 100-year return period does not satisfy the lower boundary conditions as its stable interval is [3.05, 3.15] and the length of the interval is 0.1 that is too small, thus it is ignored. The misjudgment of the lower boundary of the stable threshold interval is due to sample factors above.

As a preferred implementation, during the determination of the lower boundary $u_j$ of the stable threshold interval, it is further determined whether there is an original wave height sample value between $u_j$ and $u_{j-1}$; if so, $u_j$ is determined as the lower boundary of the stable threshold interval; and if not, $u_j$ is given up as the lower boundary of the stable threshold interval. For example, after the first threshold interval is normalized and in the obtained second threshold interval, there may be or may not be original wave height data (data in 328 samples) between any two adjacent normalized candidate thresholds. For example, if the original wave height sample data contain 2.98 and 3.07 and the calculated normalized candidate thresholds are 3 and 3.05, where 3.05 is a preliminarily determined lower boundary of the stable threshold interval, there is no original wave height sample data between the two normalized candidate thresholds. For another example, if the original wave height sample data contains 3.43 and the calculated normalized candidate thresholds are 3.4 and 3.45, where 3.45 is a preliminarily determined lower boundary of the stable threshold interval, there is original wave height sample data between the two normalized candidate thresholds. By comparing the two sets of data listed above, 3.05 is not used as the lower boundary of the stable threshold interval, and 3.45 is used as the lower boundary of the stable threshold interval.

The stable threshold interval is obtained to eliminate the influence of unstable data on the result of determination. With reference to FIGS. 2-5, both sides of each stable threshold interval will be influenced by unstable data. For example, the corresponding data on the left side of the shown stable threshold interval contains lower wave height values (the lower wave height values influence the representativeness of extreme values of the sample), while there is a small amount of corresponding data on the right side (the amount of data is insufficient to estimate the design wave height). For such unstable intervals, the data reference amount is not large and the data needs to be eliminated.

However, in the actual calculation, there will also be a situation where there may be two stable threshold intervals in a same return period by the above-described determination rule for the stable threshold interval, continuously referring to Table 1.

It can be known from Table 1 that, by the above selecting method, there may be one or more stable threshold intervals. For example, when the return period is 200-year, it is possible to obtain two stable threshold intervals which are [3.05, 4.6] and [6.3, 6.5], respectively. Thus, the problem on how to select a final stable threshold interval is proposed.

In order to solve this problem, a characteristic parameter $ch_{i,j}$ is further defined. A characteristic parameter corresponding to a threshold in a stable threshold interval is designed as 1, a characteristic parameter corresponding to a threshold in a non-stable threshold interval is defined as 0, and values of the characteristic parameter $ch_{i,j}$ corresponding to thresholds $u_j$ in the stable threshold interval in each return period are accumulated to obtain sum(j). A maximum sequence of sum(j) overlapped in each return period is obtained, and a stable threshold interval containing the threshold $u_j$ corresponding to the maximum j in the maximum sequence of sum(j) is used as a final stable threshold interval.

Specifically, in this embodiment, characteristic parameters $ch_{i,j}$ of the threshold $u_j$ from 50 years to 200 years at a step of 50-year are accumulated to obtain sum(j), where sum(j)=$ch_{50,j}$+$ch_{100,j}$+$ch_{150,j}$+$ch_{200,j}$. Then, a sum(j) sequence is obtained. The sum(j) value corresponding to the sum(j) maximum sequence is 4, and the range of candidate thresholds by which 4 can be obtained is from 3.45 to 4.5, and the maximum j in the sum(j) maximum sequence corresponds to the threshold $u_j$, that is 4.5. Since the stable interval [3.05,4.6] corresponding to the design wave height in the 200-year return period contains the threshold 4.5, [3.05, 4.6] is finally used as the stable threshold interval. However, another stable interval [6.3, 6.5] also corresponding to the 200-year return period will be regarded as disturbance and will be removed.

On this basis, in this embodiment, the stable threshold interval for the 50-year return period is finally determined as [3.45, 5.6], the stable threshold interval for the 100-year return period is finally determined as [3.45, 5.2], the stable threshold interval for the 150-year return period is finally determined as [3.05, 4.5], and the stable threshold interval for the 200-year return period is finally determined as [3.05, 4.6]. The design wave height values corresponding to each return period will be selected from the design wave height values corresponding to the stable threshold interval.

A threshold in the stable threshold interval is finally used as a reasonable threshold. The selection of the wave height threshold is also performed by the following methods.

Method 1: Any threshold in the stable threshold interval can be selected as a reasonable threshold.

Method 2: Considering the economic performance of the offshore engineering construction, the lower boundary value of the stable threshold interval can be selected as a reasonable threshold, and the design wave height value corresponding to this threshold is used to provide guidance for the offshore engineering construction.

Method 3: Considering the safety of the offshore engineering construction, the higher boundary value of the stable threshold interval can be selected as a reasonable threshold, and the design wave height value corresponding to this threshold is used to provide guidance for the offshore engineering construction. Generally, the design wave height value calculated according to the generalized Pareto distribution has the basic rule that the design wave height value will increase with the increase of the threshold and will fluctuate occasionally. For example, in the case of 50-year return period, the calculated wave height value corresponding to the threshold 5.55 is 12.12, and the calculated wave height value corresponding to the threshold 5.6 is 12.1. Although there is a fluctuation in the two wave height values, the calculated wave height value corresponding to the threshold 5.6 is relatively high with respect to the whole stable threshold interval. Therefore, in order to simplify the selection, the calculated wave height threshold corresponding to the boundary 5.6 is directly selected. If it is expected to obtain a safe result, all calculated wave height values in the threshold interval can be compared and the maximum wave height value is selected as a wave height threshold.

Figure 2:
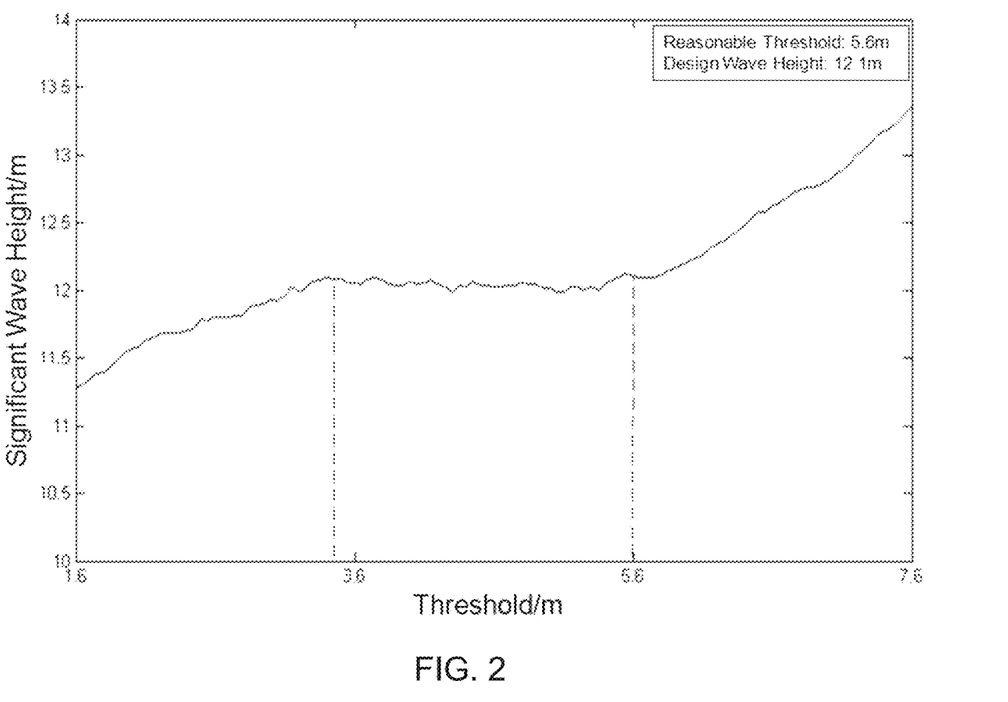
FIG. 2 shows a change of a design wave height value of a-50-year return period in a threshold interval, where a stable threshold interval of the design wave height value is indicated between two dashed lines.
Figure 3:
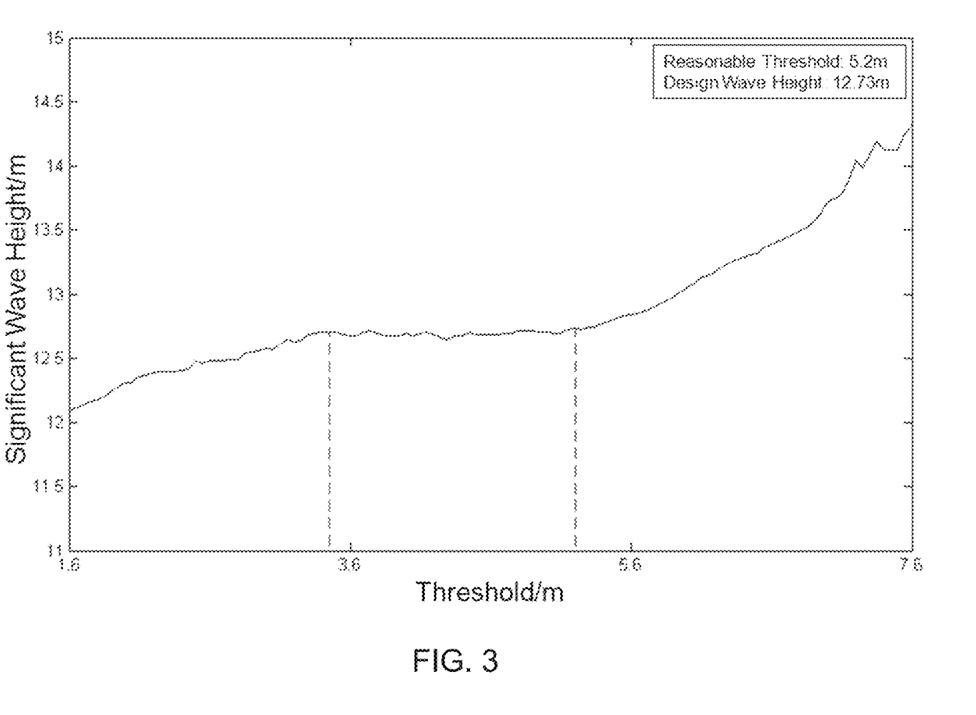
FIG. 3 shows a change of a design wave height value of a-100-year return period in a threshold interval, where a stable threshold interval of the design wave height value is indicated between two dashed lines.
Figure 4:
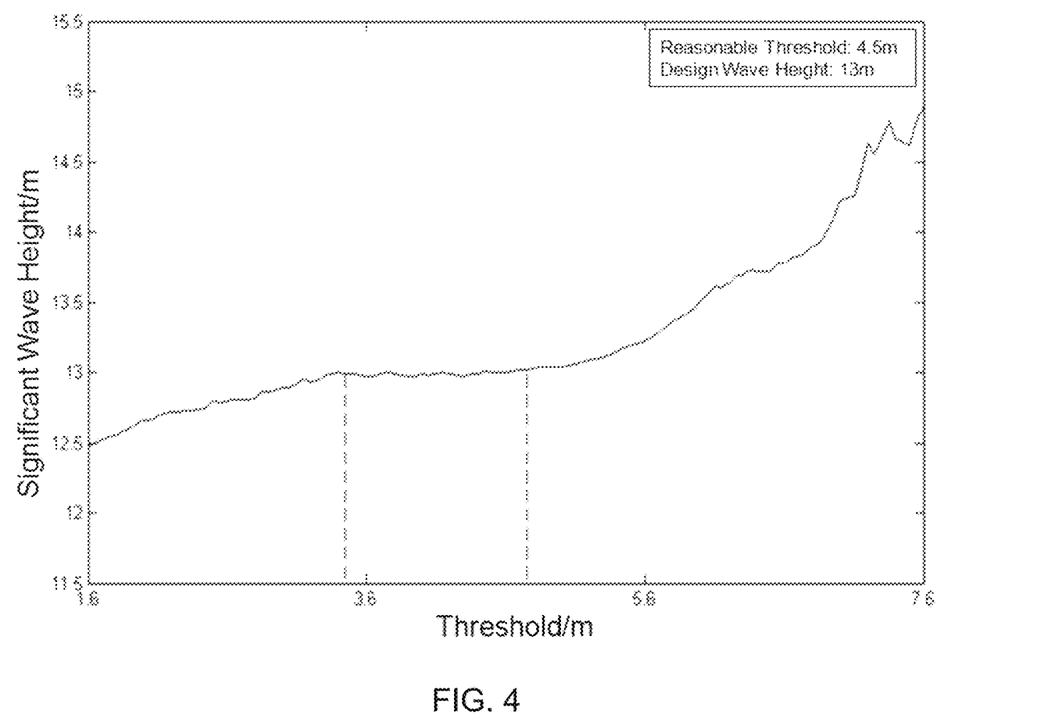
FIG. 4 shows a change in design wave height value of a-150-year return period in a threshold interval, where a stable threshold interval of the design wave height value is indicated between two dashed lines.
Figure 5:
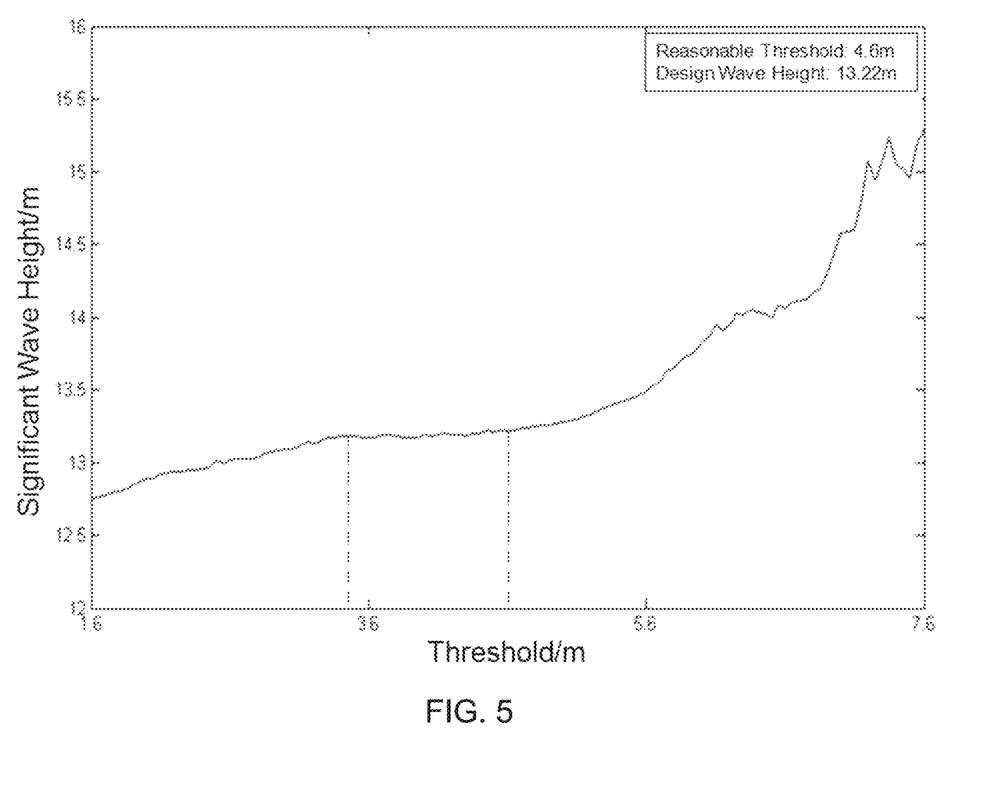
FIG. 5 shows a change in design wave height value of a-200-year return period in a threshold interval, where a stable threshold interval of the design wave height value is indicated between two dashed lines.

Specifically, in this embodiment, the higher boundary value of the stable threshold interval is used as a reasonable threshold, and the design wave height value corresponding to this reasonable threshold is used as a design wave height value. This, in the case of 50-year return period, the threshold is 5.6 m and the design wave height value is 12.1 m (as shown in FIG. 2); in the case of 100-year return period, the threshold is 5.2 m and the design wave height value is 12.73 m (as shown in FIG. 3); in the case of 150-year return period, the threshold is 4.5 m and the design wave height value is 13.0 m (as shown in FIG. 3); and, in the case of 200-year return period, the threshold is 4.6 m and the design wave height value is 13.22 m (as shown in FIG. 5).

In this method, the stability of estimated values can be determined directly and objectively to realize wave height threshold selection without human factors, and the selection result of the wave height threshold can be obtained directly and objectively. The method can realize autonomous judgment and regional application, and can better provide services for the ocean and coastal engineering.

What is claimed is:

1. A method for selecting ocean wave height threshold for ocean and coastal engineering comprising the following steps of:
    S1: acquiring, based on a target location, original wave height samples,
    determining the number of the samples $N_{tot}$ a maximum wave height $u_M$ in the samples and a minimum wave height $u_1$ in the samples, and
    calculating, within a candidate threshold interval determined by the maximum wave height $u_M$ and the minimum wave height $u_1$, and at a step size, that is a threshold step size, a normalized candidate threshold to obtain a wave height threshold interval; each of the threshold in the wave height threshold is called a candidate threshold $u_j$, j is an integer greater than 0;
    S2: determining a return period sequence i for a design wave height to determine a specified return period;
    S3: for each candidate threshold, by using all original sample data in the original wave height sample greater than the candidate threshold, based on the specified return period and according to a generalized Pareto distribution formula, calculating a design wave height corresponding to each candidate threshold $u_j$ within the wave height threshold interval to obtain a design wave height value $Hs_{i,j}$;
    S4: calculating a difference $\Delta Hs_{i,j}=Hs_{i,j}-Hs_{i,j-1}$ between design wave height values corresponding to adjacent candidate thresholds, which is called a wave height difference for short; and
    s 5: if $\Delta Hs_{i,j} \leq 0$ and three successive wave height differences following $\Delta Hs_{i,j}$ includes negative but not all negative or are all 0, considering a candidate threshold $u_j$ corresponding to $\Delta Hs_{i,j}$ as a lower boundary of a stable threshold interval; and, if six successive wave height differences following $\Delta Hs_{i,j+m}$ are all greater than or equal to 0, considering a candidate threshold $u_{j+m}$ corresponding to $\Delta Hs_{i,j+m}$ as a higher boundary of the stable threshold interval, wherein a threshold interval $[u_j, u_{j+m}]$ is the stable threshold interval, and a candidate threshold within the stable threshold interval is selected as a reasonable threshold for design wave height estimation.

2. The method for selecting the ocean wave height threshold according to claim 1, wherein, in S5, a higher boundary value $u_{j+m}$ corresponding to the stable threshold interval $[u_j, u_{j+m}]$ is selected as a reasonable threshold.

3. The method for selecting the ocean wave height threshold according to claim 2, wherein, in S5, it is further determined whether the number of times when six successive wave height differences following $\Delta Hs_{i,j+m}$ are equal to 0 is less than 3; and, if so, $u_{j+m}$ corresponding to $\Delta Hs_{i,j+m}$ is considered as a higher boundary of the stable threshold interval.

4. The method for selecting the ocean wave height threshold according to claim 3, wherein, in S5, during the determination of a lower boundary of the stable threshold interval, it is further determined whether three successive wave height differences following $\Delta Hs_{i,j}$ are greater than or equal to the threshold step size; if so, $u_j$ is given up as the lower boundary of the stable threshold interval; and if not, $u_j$ is determined as the lower boundary of the stable threshold interval.

5. The method for selecting the ocean wave height threshold according to claim 4, wherein, in S5, during the determination of the lower boundary of the stable threshold interval, it is further determined whether there is an original wave height sample value between $u_j$ and $u_{j-1}$; if so, $u_j$ is determined as the lower boundary of the stable threshold interval; and if not, $u_j$ is given up as the lower boundary of the stable threshold interval.

6. The method for selecting the ocean wave height threshold according to claim 5, wherein, during the determination of the stable threshold interval $[u_j, u_{j+m}]$, the length m+1 of the stable threshold interval needs to be greater than 3, that is, m is an integer greater than 2.

7. The method for selecting the ocean wave height threshold according to claim 6, wherein, when the specified return period is divided and/or extended into a plurality of sub-specified return periods, a design wave height value $Hs_{i,j}$ corresponding to each candidate threshold $u_j$ in each sub-specified return period is calculated respectively according to S3; and further, a stable threshold interval in each sub-specified return period is obtained respectively by S4 and S5.

8. The method for selecting the ocean wave height threshold according to claim 7, wherein, further includes the following step of:
    S6: further defining characteristic parameter $ch_{i,j}$, where a characteristic parameter corresponding to each candidate threshold in a stable threshold interval is defined as 1, a characteristic parameter corresponding to each candidate threshold in a non-stable threshold interval is defined as 0, and values of the characteristic parameter $ch_{i,j}$ corresponding to the candidate thresholds $u_j$ within the stable threshold interval in each return period are accumulated to obtain sum(j); and, acquiring a maximum sequence of sum(j) overlapped in each return period, and using a stable threshold interval containing a threshold $u_j$ corresponding to the maximum j value in the maximum sequence of sum(j) as a final stable threshold interval.

9. The method for selecting the ocean wave height threshold according to claim 1, wherein, in S5, it is further determined whether the number of times when six successive wave height differences following $\Delta Hs_{i,j+m}$ are equal to 0 is less than 3; and, if so, $u_{j+m}$ corresponding to $\Delta Hs_{i,j+m}$ is considered as a higher boundary of the stable threshold interval.

10. The method for selecting the ocean wave height threshold according to claim 9, wherein, in S5, during the determination of a lower boundary of the stable threshold interval, it is further determined whether three successive wave height differences following $\Delta Hs_{i,j}$ are greater than or equal to the threshold step size; if so, $u_j$ is given up as the lower boundary of the stable threshold interval; and if not, $u_j$ is determined as the lower boundary of the stable threshold interval.

11. The method for selecting the ocean wave height threshold according to claim 10, wherein, in S5, during the determination of the lower boundary of the stable threshold interval, it is further determined whether there is an original wave height sample value between $u_j$ and $u_{j-1}$; if so, $u_j$ is determined as the lower boundary of the stable threshold interval; and if not, $u_j$ is given up as the lower boundary of the stable threshold interval.

12. The method for selecting the ocean wave height threshold according to claim 11, wherein, when the specified return period is divided and/or extended into a plurality of sub-specified return periods, a design wave height value $Hs_{i,j}$ corresponding to each candidate threshold $u_j$ in each sub-specified return period is calculated respectively according to S3; and further, a stable threshold interval in each sub-specified return period is obtained respectively by S4 and S5; and, the method further includes the following step of S6: further defining characteristic parameter $ch_{i,j}$, where a characteristic parameter corresponding to each candidate threshold in a stable threshold interval is defined as 1, a characteristic parameter corresponding to each candidate threshold in a non-stable threshold interval is defined as 0, and values of the characteristic parameter $ch_{i,j}$ corresponding to the candidate thresholds within the stable threshold interval in each return period are accumulated to obtain sum(j); and, acquiring a maximum sequence of sum(j) overlapped in each return period, and using a stable threshold interval containing a threshold $u_j$ corresponding to the maximum j value in the maximum sequence of sum(j) as a final stable threshold interval.

13. The method for selecting the ocean wave height threshold according to claim 11, wherein, during the determination of the stable threshold interval [$u_j$, $u_{j+m}$], the length m+1 of the stable threshold interval needs to be greater than 3, that is, m is an integer greater than 2.

14. The method for selecting the ocean wave height threshold according to claim 13, wherein, when the specified return period is divided and/or extended into a plurality of sub-specified return periods, a design wave height value $Hs_{i,j}$ corresponding to each candidate threshold $u_j$ in each sub-specified return period is calculated respectively according to S3; and further, a stable threshold interval in each sub-specified return period is obtained respectively by S4 and S5; and, the method further includes the following step of S6: further defining characteristic parameter $ch_{i,j}$, where a characteristic parameter corresponding to each candidate threshold in a stable threshold interval is defined as 1, a characteristic parameter corresponding to each candidate threshold in a non-stable threshold interval is defined as 0, and values of the characteristic parameter $ch_{i,j}$ corresponding to the candidate thresholds $u_j$ within the stable threshold interval in each return period are accumulated to obtain sum(j); and, acquiring a maximum sequence of sum(j) overlapped in each return period, and using a stable threshold interval containing a threshold $u_j$ corresponding to the maximum j value in the maximum sequence of sum(j) as a final stable threshold interval.

15. The method for selecting the ocean wave height threshold according to claim 10, wherein, when the specified return period is divided and/or extended into a plurality of sub-specified return periods, a design wave height value $Hs_{i,j}$ corresponding to each candidate threshold $u_j$ in each sub-specified return period is calculated respectively according to S3; and further, a stable threshold interval in each sub-specified return period is obtained respectively by S4 and S5; and, the method further includes the following step of S6: further defining characteristic parameter $ch_{i,j}$, where a characteristic parameter corresponding to each candidate threshold in a stable threshold interval is defined as 1, a characteristic parameter corresponding to each candidate threshold in a non-stable threshold interval is defined as 0, and values of the characteristic parameter $ch_{i,j}$ corresponding to the candidate thresholds $u_j$ within the stable threshold interval in each return period are accumulated to obtain sum(j); and, acquiring a maximum sequence of sum(j) overlapped in each return period, and using a stable threshold interval containing a threshold $u_j$ corresponding to the maximum j value in the maximum sequence of sum(j) as a final stable threshold interval.

16. The method for selecting the ocean wave height threshold according to claim 1, wherein, in S5, during the determination of a lower boundary of the stable threshold interval, it is further determined whether three successive wave height differences following $\Delta Hs_{i,j}$ are greater than or equal to the threshold step size; if so, $u_j$ is given up as the lower boundary of the stable threshold interval; and if not, $u_j$ is determined as the lower boundary of the stable threshold interval.

17. The method for selecting the ocean wave height threshold according to claim 1, wherein, in S5, during the determination of the lower boundary of the stable threshold interval, it is further determined whether there is an original wave height sample value between $u_j$ and $u_{j-1}$; if so, $u_j$ is determined as the lower boundary of the stable threshold interval; and if not, $u_j$ is given up as the lower boundary of the stable threshold interval.

18. The method for selecting the ocean wave height threshold according to claim 1, wherein, during the determination of the stable threshold interval [$u_j$, $u_{j+m}$] the length m+1 of the stable threshold interval needs to be greater than 3, that is, m is an integer greater than 2.

19. The method for selecting the ocean wave height threshold according to claim 1, wherein, when the specified return period is divided and/or extended into a plurality of sub-specified return periods, a design wave height value $Hs_{i,j}$ corresponding to each candidate threshold $u_j$ in each sub-specified return period is calculated respectively according to S3; and further, a stable threshold interval in each sub-specified return period is obtained respectively by S4 and S5.

20. The method for selecting the ocean wave height threshold according to claim 19, wherein, further includes the following step of:

S6: further defining characteristic parameter $ch_{i,j}$, where a characteristic parameter corresponding to each candidate threshold in a stable threshold interval is defined as 1, a characteristic parameter corresponding to each candidate threshold in a non-stable threshold interval is defined as 0, and values of the characteristic parameter $ch_{i,j}$ corresponding to the candidate thresholds $u_j$ within the stable threshold interval in each return period are accumulated to obtain sum(j); and, acquiring a maximum sequence of sum(j) overlapped in each return period, and using a stable threshold interval containing a threshold $u_j$ corresponding to the maximum j value in the maximum sequence of sum(j) as a final stable threshold interval.

* * * * *